(12) United States Patent
Williamson

(10) Patent No.: US 7,504,472 B2
(45) Date of Patent: *Mar. 17, 2009

(54) RAPIDLY CRYSTALLIZING POLYCARBONATE COMPOSITION

(75) Inventor: David T. Williamson, Hockessin, DE (US)

(73) Assignee: E. I. du Pont de Nemours + Company, Wilmington, DE (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/292,457

(22) Filed: Dec. 2, 2005

(65) Prior Publication Data

US 2006/0276580 A1 Dec. 7, 2006

Related U.S. Application Data

(60) Provisional application No. 60/686,688, filed on Jun. 2, 2005.

(51) Int. Cl.
*C06G 64/00* (2006.01)
*C08G 63/02* (2006.01)

(52) U.S. Cl. ............... 528/196; 428/35.2; 428/35.7; 524/445; 528/198

(58) Field of Classification Search .......... 524/430, 524/431, 445; 525/445, 543; 528/196, 198; 428/35.2, 35.7
See application file for complete search history.

(56) References Cited

U.S. PATENT DOCUMENTS

| 2,991,273 | A | 7/1961 | Hechelhammer et al. |
| 2,999,846 | A | 9/1961 | Schnell et al. |
| 3,028,365 | A | 4/1962 | Schnell et al. |
| 3,153,008 | A | 10/1964 | Fox |
| 4,123,436 | A | 10/1978 | Holub et al. |
| 5,191,001 | A | 3/1993 | Kuhlig et al. |
| 5,214,073 | A | 5/1993 | Fukawa et al. |
| 5,633,018 | A | 5/1997 | Stouffer et al. |
| 5,717,056 | A | 2/1998 | Varadarajan et al. |
| 6,534,623 | B1 | 3/2003 | Gochanour |
| 6,759,452 | B2* | 7/2004 | Border et al. ............ 523/223 |
| 2003/0207984 | A1 | 11/2003 | Ding et al. |
| 2005/0065263 | A1* | 3/2005 | Chung et al. ............ 524/445 |
| 2005/0096422 | A1* | 5/2005 | Torkelson et al. ......... 524/445 |
| 2006/0141183 | A1* | 6/2006 | Williamson et al. ....... 428/35.2 |

FOREIGN PATENT DOCUMENTS

| EP | 0 221 225 A1 | 5/1987 |
| EP | 0 170 299 B1 | 1/1990 |
| EP | 0 848 030 A1 | 6/1998 |
| EP | 0 864 597 B1 | 2/2002 |
| JP | 178979 | 3/1989 |
| WO | WO 99/41299 | * 8/1999 |

OTHER PUBLICATIONS

Xianbo Hu et al., "Enhanced Crystallization of Polycarbonate by Nano-Scale Clays in Supercritical Carbon Dioxide", Abstract of Papers, 226th ACS National Meeting, New York, NY, Sep. 7-11, 2003, PMSE-388, Publisher: American Chemical Society, Washington, DC.
P. J. Yoon et al., "Polycarbonate Nanocomposites. Part 1. Effect of Organoclay Structure on Morphology and Properties", Polymer 44 (2003, pp. 5323-5339.
P. J. Yoon et al., "Polycarbonate Nanocomposites. Part 2. Degradation and Color Formation", Polymer 44 (2003) pp. 5341-5343.
Vaia et al., "Synthesis of Polycarbonate-Layered Silicate Nanocomposites via Cyclic Oligomers", Macromolecules 2000, 33, pp. 2000-2004.
H. H. Murray, "Traditional and New Applications for Kaolin, Smectite, and Palygorskite: A General Overview", Applied Clay Science 17 (2000), pp. 207-221.
L. Bokobza et al., "Fibre Reinforcement of Elastomers: Nanocomposites Based on Sepiolite and Poly(hydroxyethyl Acrylate)", Polymer International 53 (2004) pp. 1060-1065.
Daniel J. Brunelle, "Polycarbonates", Encyclopedia of Polymer Science and Technology, John Wiley & Sons, Inc. (2002).
Daniel J. Brunelle, "Chapter 6: Cyclic Oligomers of Polycarbonates and Polyesters", Cyclic Polymers, Second Editions, J. A. Semlyn (ed.), (2002), Kluwer Academic Publishers (Netherlands), 185-228.

* cited by examiner

*Primary Examiner*—Terressa M Boykin

(57) ABSTRACT

This invention concerns a process for the preparation of semicrystalline polycarbonate compositions by synthesizing the polycarbonate in the presence of a sepiolite-type clay as a nucleating agent. The semicrystalline compositions produced are useful as starting materials for the production of high molecular weight polycarbonate by solid state polymerization.

19 Claims, 1 Drawing Sheet

RAPIDLY CRYSTALLIZING POLYCARBONATE COMPOSITION

FIELD OF THE INVENTION

This invention concerns a process for the preparation of semicrystalline polycarbonate compositions by synthesizing the polycarbonate in the presence of a sepiolite-type clay as a nucleating agent. The semicrystalline compositions produced are useful as starting materials for the production of high molecular weight polycarbonate by solid state polymerization.

TECHNICAL BACKGROUND OF THE INVENTION

High molecular weight polycarbonate is a valuable engineering resin useful for producing many objects, especially clear sheeting, compact recording discs and housings for electronic equipment. There are a number of ways this resin can be produced. The most common industrial method is the interfacial polymerization method in which bisphenol A and phosgene are reacted in a heterogeneous mixture of water and methylene chloride. Although this process produces the desired high molecular weight polymer, there are disadvantages associated with it. Phosgene is extremely toxic and hence results in safety concerns. In addition the use of methylene chloride raises environmental concerns. Finally, the polymer produced by this method contains residues of sodium chloride, which are produced by neutralization of sodium hydroxide used to dissolve bisphenol A in water. This impurity is undesirable in some applications and is difficult to remove.

A second method used to produce polycarbonate is the melt polymerization of bisphenol A and diphenyl carbonate. This process requires the removal of the condensation by-product from the viscous polymer melt. The high temperatures required to achieve low viscosity can lead to degradation of the polycarbonate polymer.

A final method known for producing high molecular weight polycarbonate is solid state polymerization. In this process, a low or moderate molecular weight polymer is produced and isolated as a solid material such as chips, particles, granules, or powders. Particles of controlled size and shape are most desirable. The polymerization of this solid material is accomplished by heating it to a temperature below its melting temperature with a heated inert gas. The solid state polymerization is thus carried out at lower temperature, which reduces the degradation problem. Before this final step of the solid state polymerization is carried out, the starting materials must be crystallized. For polycarbonate, this step is known to be very difficult because of the slow crystallization rate of polycarbonate. Although technologies for crystallization of polycarbonate have been described, all of these technologies have serious drawbacks associated with them.

The difficulties in crystallizing polycarbonate prior to solid state polymerization are related to the slow development of crystallinity in this polymer. The time required to obtain the maximum level of crystallinity in polycarbonate is much longer than for other polymers. The crystallization rate found for polycarbonate oligomer is greater than that of high molecular weight polycarbonate; but it is still very low compared to other polymers, such as polyethylene terephthalate, of similar molecular weight; i.e., it exhibits much longer crystallization times.

The second factor limiting crystallization rate is nucleation. It is generally known that the rate of growth of crystallization can be accelerated in polymers by the addition of a nucleating agent. Examples of commonly used nucleating agents include inorganic oxide materials such as talc, or organic salts such as sodium benzoate. These materials suffer from a common weakness in that they require the addition of a foreign substance, essentially an impurity, to the polycarbonate resin to be produced. In many applications, this can adversely affect the end use properties of the resin.

European Patent No. 0 864 597 discloses a process for the solid state polymerization of polycarbonate oligomer under an atmosphere of a swelling solvent gas or under a stream of a poor solvent gas. The process is applied to either amorphous oligomer particles or powders or to semicrystalline particles or powders. The process does not include a separate crystallization step and hence does not allow one to control the conditions under which crystallization occurs. The swelling solvent gas or poor solvent gas is present throughout the process along with a second inert gas. Since this mixed gas stream will also contain condensation by-products that must be removed during the solid state polymerization, the required constant presence of swelling or poor solvent gas complicates the gas handling requirements of this process, especially if the gas is recycled. Suitable swelling solvents listed include aromatic hydrocarbons, e.g., benzene and substituted benzenes; ethers, e.g., tetrahydrofuran and dioxane; and ketones, e.g., methyl ethyl ketone. Suitable poor solvent gases listed include cyclic hydrocarbons, straight chain or branched saturated hydrocarbons, and unsaturated hydrocarbons.

U.S. Pat. No. 5,191,001 discloses a process for the production of polycarbonate by solid state polymerization of an intimate mixture of oligomeric polycarbonates. The oligomers to be used in this process have a particular endgroup composition. Although crystallization is a required step for this process, the authors do not disclose any particular crystallization technology. A number of general schemes of possible applicability to many polymers are included. The only crystallization method applied is the well-known solution procedure where a semicrystalline powder is prepared by solvent removal from a solution of the oligomers in methylene chloride.

U.S. Pat. No. 5,717,056 discloses a method for preparing a polycarbonate comprising the steps of (a) converting a precursor polycarbonate to an enhanced crystallinity precursor polycarbonate, and (b) polymerizing in the solid state. Converting the precursor polycarbonate to an enhanced crystallinity precursor polycarbonate entails contact at above 110° C. with a basic compound. Specific basic compounds listed include alkali metal hydroxides, tetraalkylammonium hydroxides, tetraalkylammonium carboxylates, tetraalkylphosphonium hydroxides, and tetraalkylphosphonium hydroxides. The preferred basic compounds are tetramethylammonium maleate and tetraethylammonium hydroxide. The procedure described to produce this enhanced crystallinity precursor polycarbonate involves contact of polycarbonate particles with a solution containing this basic compound followed by a thermal treatment.

European Patent No. 0 848 030 discloses a process for crystallizing a polycarbonate prepolymer comprising dissolving it in a solvent at elevated temperatures, then cooling the solution to effect crystallization. Preferred solvents are aromatic compounds which form solutions of a concentration of 20-90% polycarbonate. The crystalline product produced is then shaped into the form desired for solid state polymerization. This shape is then dried to volatilize the solvent. This process requires many steps to produce the desired crystallized product.

Japanese Patent Heisei 93 178979 discloses a process for the manufacture of aromatic polycarbonate by solid state polymerizing crystalline polycarbonate prepolymer characterized in that intermediate polymer that has been solid state polymerized is treated with a crystallization solvent and then subjected again to solid state polymerization.

It is well known that polycarbonate can be crystallized by exposure to solvents such as acetone. U.S. Pat. No. 5,214,073 discloses a method for preparing a porous crystallized polycarbonate oligomer or prepolymer. In one process described an amorphous polycarbonate oligomer is slurried with acetone to produce the crystallized polycarbonate oligomer. The large amorphous particles that are charged to the acetone bath break up into a very fine powder during the crystallization process. A second process described consists of the melt extrusion of the prepolymer melt into a stirred volume of acetone. This also produces a very fine crystallized powder. Both powders are dried before being subjected to the solid state polymerization. A very fine powder is often not desirable in solid state polymerization because of difficulties associated with material handling.

U.S. Pat. No. 6,534,623 discloses a process for the preparation of crystalline polycarbonate oligomer compositions from amorphous polycarbonate oligomer compositions comprising the steps of preparing a mixture of the amorphous polycarbonate with a fugitive crystallization enhancing agent, such as n-butyl stearate, and/or a high melting particulate polymeric nucleating agent, such as crystallized polycarbonate oligomer; forming this mixture into a shape desired; and crystallizing this mixture at a temperature above its glass transition temperature. The fugitive crystallization enhancing agent could present a cycle time problem in practice if frequent shut downs for cleaning were needed. The crystallized polycarbonate oligomer agent was prepared by heating in a vacuum oven, followed by solid state polymerization for 24 hours.

Recently, Hu and Lesser crystallized polycarbonate and a polycarbonate/organo-modified montmorillonite clay nanocomposite in the presence of supercritical carbon dioxide (Xianbo Hu and Alan Lesser, "Enhanced crystallization of polycarbonate by nano-scale clays in supercritical carbon dioxides," "Abstracts of Papers," 226th ACS National Meeting, New York, N.Y., United States, Sep. 7-11, 2003 (2003), PMSE-388. Publisher: American Chemical Society, Washington, D.C.). While the presence of the montmorillonite enhanced the degree of crystallization of polycarbonate in the presence of supercritical carbon dioxide, the crystallization behavior of polycarbonate was unchanged by the presence of the montmorillonite clay in the absence of supercritical carbon dioxide.

Nanocomposites are polymers reinforced with nanometer sized particles, i.e., particles with a dimension on the order of 1 to several hundred nanometers. These materials can be used in structural, semistructural, high heat underhood, and Class A automotive components, among others, offering a variety of desirable properties including: low coefficient of thermal expansion, high heat deflection temperatures, lightweight, improved scratch resistance, and potential application in automotive Class A surfaces. Polycarbonate/clay nanocomposites have typically been prepared by melt compounding either sodium cloisite or organically modified montmorillonite (OMMT) into the polycarbonate. For example, Paul et al. made polycarbonate/clay nanocomposites using a twin screw extruder to melt compound polycarbonate resin and sodium montmorillonite clay that had been organically modified by cation exchange with a variety of amine salts (P. J. Yoon, D. L. Hunter, D. R. Paul, Polymer 44 (2003) 5323-5339 and 5341-5354). Unfortunately, the high temperature needed for the melt compounding can result in degradation of both the organic species with which the clay was modified, resulting in discoloration, and the polycarbonate itself, lowering its molecular weight. The long residence times needed to achieve better clay dispersion resulted in increased color.

Vaia et al. (X. Huang, S. Lewis, W. J. Brittain, and R. A. Vaia. Macromolecules 33 (2000) 2000-2004) prepared partially exfoliated polycarbonate nanocomposite by first mixing cyclic carbonate oligomers with ditallow dimethyl-exchanged montmorillonite in a Brabender mixer at 180° C. for one hour, which partially exfoliated the montmorillonite, followed by ring-opening polymerization of the cyclic carbonate oligomers, preserving the partial exfoliation. However, an analogous experiment using linear polycarbonate instead of the cyclic oligomers produced an intercalated structure (alternating layers of polymer and silicate with a repeat distance of only a few nanometers), rather than the high dispersion of an exfoliated structure. Conventional melt or solution processing of the ditallow dimethyl-exchanged montmorillonite with either cyclic carbonate oligomers or linear polycarbonate similarly produced intercalated structures.

There remains a need for an efficient, effective, environmentally benign and economical process for the crystallization of polycarbonate.

SUMMARY OF THE INVENTION

Provided herein is an improved method for crystallization of polycarbonate for polycarbonate production by solid state polymerization.

This invention provides a polycarbonate nanocomposite composition, comprising
  (a) at least one polycarbonate and
  (b) exfoliated sepiolite-type clay.

It is preferred that the exfoliated sepiolite-type clay be present at about 0.1 to about 20 weight percent, based on the weight of polycarbonate plus sepiolite-type clay.

This invention further provides a method for preparing a polycarbonate nanocomposite composition, comprising the steps:
  (a) polymerizing at least one polycarbonate precursor in the presence of a sepiolite-type clay and a catalyst to produce a polycarbonate; and
  (b) optionally, solid state polymerizing the product of step (a).

This invention also concerns a process for the formation of a shaped part from a polycarbonate nanocomposite, comprising the steps:
  (a) preparing a nanocomposite of polycarbonate and sepiolite-type clay, by polymerizing at least one polycarbonate precursor in the presence of a sepiolite-type clay and a catalyst;
  (b) heating the nanocomposite to a temperature, above the glass transition temperature of the polycarbonate produced in step (a), at which the nanocomposite it formable;
  (c) optionally, melt-mixing the nanocomposite with one or more additional ingredients;
  (d) forming the product of step (b) or (c) into the desired shape; and
  (e) cooling the product of step (d) from a temperature above the glass transition temperature of said polycarbonate to a temperature below said glass transition temperature.

Further provided are polymer blends and articles comprising the polycarbonate nanocomposites of the present invention.

DETAILED DESCRIPTION OF THE INVENTION

Figure 1:
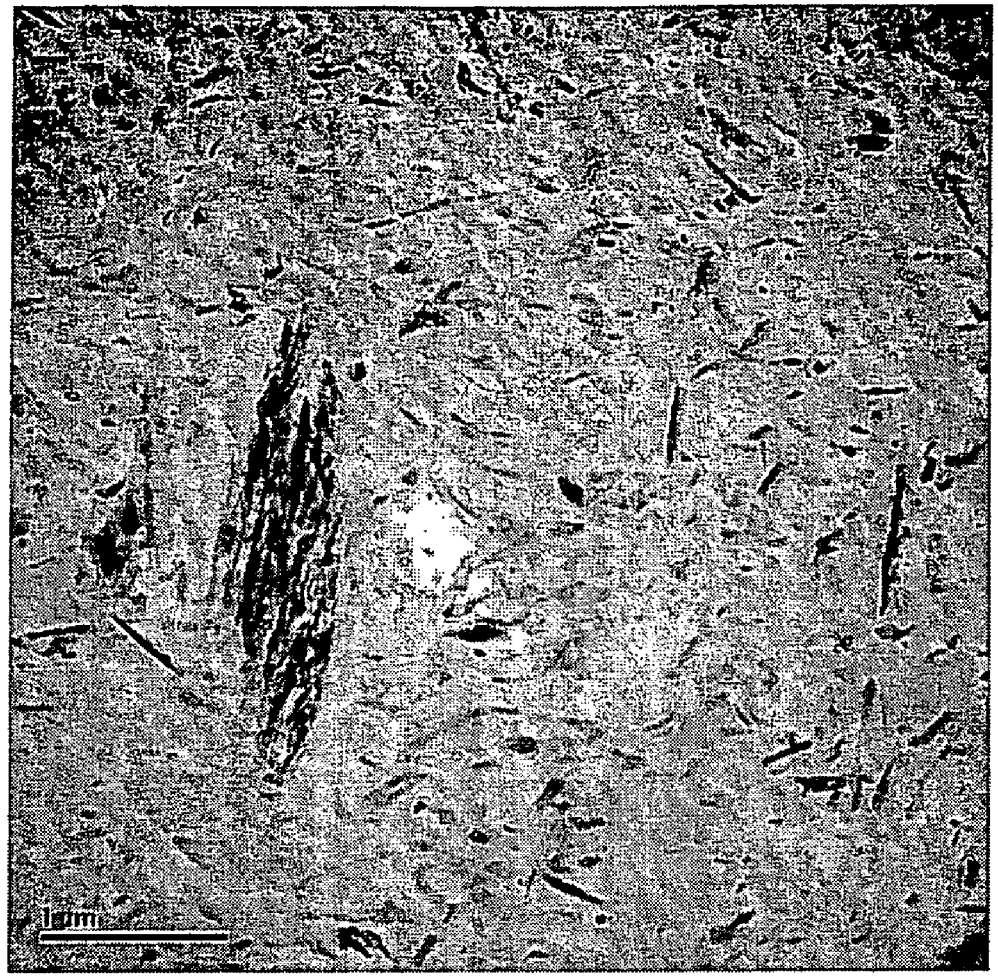
FIG. 1 is a transmission electron micrograph of polycarbonate containing exfoliated sepiolite (PANGEL® B20).

In the context of this disclosure, a number of terms shall be utilized.

As used herein, the term "nanocomposite" or "polymer nanocomposite" means a polymeric material which contains particles, dispersed throughout the polymeric material, having at least one dimension in the 0.1 to 100 nm range ("nanoparticles"). The polymeric material in which the nanoparticles are dispersed is often referred to as the "polymer matrix." The term "polycarbonate composite" refers to a nanocomposite in which the polymeric material includes at least one polycarbonate.

As used herein, the term "sepiolite-type clay" refers to both sepiolite and attapulgite (palygorskite) clays.

The term "exfoliate" literally refers to casting off in scales, laminae, or splinters, or to spread or extend by or as if by opening out leaves. In the case of smectic clays, "exfoliation" refers to the separation of platelets from the smectic clay and dispersion of these platelets throughout the polymer matrix. As used herein, for sepiolite-type clays, which are fibrous in nature, "exfoliation" or "exfoliated" means the separation of fiber bundles or aggregates into nanometer diameter fibers which are then dispersed throughout the polymer matrix.

As used herein, the term "polycarbonate" refers to a polymer comprising the divalent residue of dihydric phenols bonded through a carbonate linkage. It includes copolycarbonates, homopolycarbonates and (co)polyestercarbonates.

As used herein, "low molecular weight polycarbonate" is defined as polycarbonate having a weight average molecular weight of 10,000 daltons or less. The terms "low molecular weight polycarbonate," "oligomeric polycarbonate," "polycarbonate oligomers," and "prepolymer" are used interchangeably.

As used herein, "polycarbonate precursor" means material which can be polymerized to a polycarbonate, such as, but not limited to, carbonate/diol mixtures, a mixture of diol/phosgene/solvent for interfacial polymerization, macrocyclic polycarbonate oligomers, and linear polycarbonate oligomers.

As used herein, a "macrocyclic" molecule means a cyclic molecule having at least one ring within its molecular structure that contains 8 or more atoms covalently connected to form the ring.

As used herein, "oligomer" means a molecule that contains 2 or more identifiable structural repeat units of the same or different formula.

As used herein, the term "alkyl" means a univalent group derived from an alkane by removing a hydrogen atom from any carbon atom: —$C_nH_{2n+1}$ where $n \geq 1$.

As used herein, the term "alkoxy" means a univalent group R—O— where R is an alkyl group. An example is the methoxy group, $CH_3O$—.

As used herein, "a divalent aromatic group" means an aromatic group with links to other parts of the cyclic molecule. For example, a divalent aromatic group may include a meta- or para-linked monocyclic aromatic group. Examples are the meta- and para-phenylene groups.

As used herein, "an aryl group" means a univalent group derived from a monocyclic or polycyclic aromatic compound by removal of a hydrogen atom from a ring carbon atom.

As used herein, the term "carbocyclic" means having or relating to or characterized by a ring composed of carbon atoms.

As used herein, the term heterocyclic means having or relating to or characterized by a ring of atoms of more than one kind; especially a ring of carbon atoms containing at least one atom that is not carbon.

As used herein, "a solid particulate filler exclusive of the sepiolite-type clay" means any solid (infusible at temperatures to which the composition is normally exposed) which is finely divided enough to be dispersed under melt mixing conditions (see below) into the composition.

Where a range of numerical values is recited herein, unless otherwise stated, the range is intended to include the endpoints thereof, and all integers and fractions within the range. It is not intended that the scope of the invention be limited to the specific values recited when defining a range.

Sepiolite and Attapulgite

Clay minerals and their industrial applications are reviewed by H. H. Murray in Applied Clay Science 17(2000) 207-221. Two types of clay minerals are commonly used in nanocomposites: kaolin and smectite. The molecules of kaolin are arranged in two sheets or plates, one of silica and one of alumina. The most widely used smectites are sodium montmorillonite and calcium montmorillonite. Smectites are arranged in two silica sheets and one alumina sheet. The molecules of the montmorillonite clay minerals are less firmly linked together than those of the kaolin group and are thus further apart.

Sepiolite [$Mg_4Si_6O_{15}(OH)_2 \cdot 6(H_2O)$] is a hydrated magnesium silicate filler that exhibits a high aspect ratio due to its fibrous structure. Unique among the silicates, sepiolite is composed of long lath-like crystallites in which the silica chains run parallel to the axis of the fiber. The material has been shown to consist of two forms, an $\alpha$ and a $\beta$ form. The $\alpha$ form is known to be long bundles of fibers and the $\beta$ form is present as amorphous aggregates.

Attapulgite (also known as palygorskite) is almost structurally and chemically identical to sepiolite, except that attapulgite has a slightly smaller unit cell. As used herein, the term "sepiolite-type clay" includes attapulgite, as well as sepiolite itself.

Sepiolite-type clays are layered fibrous materials in which each layer is made up of two sheets of tetrahedral silica units bonded to a central sheet of octahedral units containing magnesium ions (see, e.g., FIGS. 1 and 2 in L. Bokobza et al., Polymer International, 53, 1060-1065 (2004)). The fibers stick together to form fiber bundles, which in turn can form agglomerates. These agglomerates can be broken apart by industrial processes such as micronization or chemical modification. (See, e.g., European Patent 170,299 to Tolsa, S. A.)

The amount of exfoliated sepiolite-type clay presenting the nanocomposite composition of the present invention ranges from about 0.1 to about 20 wt % based on the weight of polycarbonate plus sepiolite-type clay. The specific amount chosen will depend on the intended use of the nanocomposite, as is well understood in the art.

Sepiolite-type clays are available in a high purity ("rheological grade"), uncoated form (e.g., PANGEL® S9 sepiolite clay from the Tolsa Group, Madrid, Spain) or, more commonly, treated with an organic material to make the clay more "organophilic," i.e., more compatible with systems of low-tomedium polarity (e.g., PANGEL® B20 sepiolite clay from the Tolsa Group). An example of such a coating for sepiolite-type clay is a quaternary ammonium salt such as dimethyl-benxylalkylammonium chloride, as disclosed in European Patent Application 221,225.

Polycarbonates

Polycarbonates useful in this invention comprise the divalent residue of dihydric phenols bonded through a carbonate linkage and are represented by the formula:

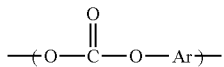

wherein Ar is a divalent aromatic group. Ar is preferably a divalent aromatic group represented by the formula: —$Ar^1$—Y—$Ar^2$— wherein each of $Ar^1$ and $Ar^2$ independently represents a divalent carbocyclic or heterocyclic aromatic group having from 5 to 30 carbon atoms, and Y represents a divalent alkane group having from 1 to 30 carbon atoms.

Each of divalent aromatic groups $Ar^1$ and $Ar^2$ is either unsubstituted or substituted with at least one substituent which does not adversely affect the solid-state polymerization reaction. Examples of suitable substituents include a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

As the heterocyclic aromatic group, as used throughout this disclosure, aromatic groups having one or more ring nitrogen atoms, oxygen atoms or sulfur atoms may be mentioned.

Representative examples of divalent aromatic groups include a phenylene group, a naphthylene group, a biphenylene group and a pyridylene group, each of which is unsubstituted or substituted with at least one substituent, as mentioned above.

Representative examples of divalent alkane groups include organic groups represented by the formulae:

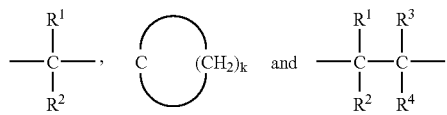

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring carbon atoms, a carbocyclic aromatic group having from 5 to 10 ring carbon atoms or a carbocyclic aralkyl group having from 6 to 10 carbon atoms, and k represents an integer of from 3 to 11, inclusive. A particularly preferred divalent alkane group Y is the isopropylidene group:

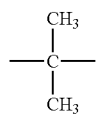

Preferred examples of divalent aromatic groups include those of the formulae:

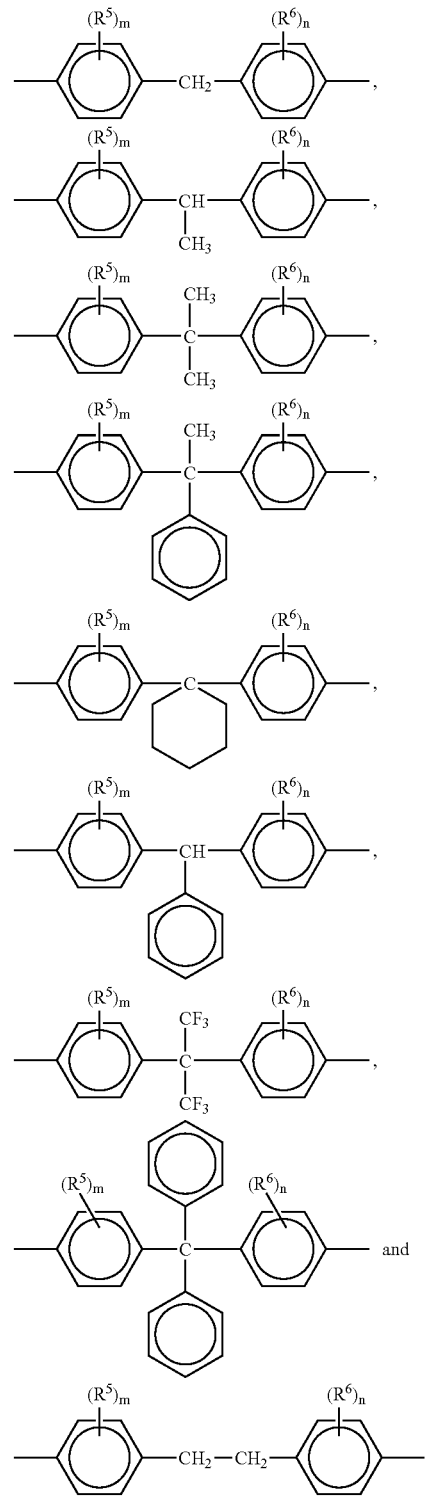

wherein each of $R^5$ and $R^6$ independently represents a hydrogen atom, a halogen atom, an alkyl group having from 1 to 10 carbon atoms, an alkoxy group having from 1 to 10 carbon atoms, a cycloalkyl group having from 5 to 10 ring carbon atoms or a phenyl group; each of m and n independently represents an integer of from 1 to 4; when m is an integer of from 2 to 4, each $R^5$ may be the same or different; and when n is an integer of from 2 to 4, each $R^6$ may be the same or different. A particularly preferred Ar is one wherein Y is isopropylidene and $Ar^1$ and $Ar^2$ are each para-phenylene, $-C_6H_4-$,

Divalent aromatic group Ar may contain a divalent aromatic group represented by the formula $-Ar^1-Z-Ar^2-$ wherein $Ar^1$ and $Ar^2$ are as defined above and Z represents a bond, or a divalent group, such as $-O-$, $-CO-$, $-S-$, $-SO-$, $-SO_2-$, $-COO-$, and $-CON(R^1)-$, wherein $R^1$ is as defined above, in an amount of 0 to 15 mole %, based on the total number of moles of all of Ar's.

Examples of such divalent aromatic groups include those of the formulae:

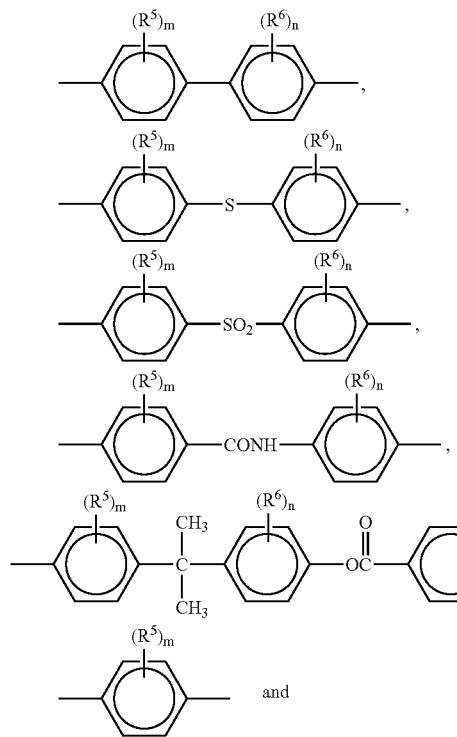

wherein $R^5$, $R^6$, m and n have the same meanings as defined above.

The polycarbonate may contain, as Ar, one type of a divalent aromatic group mentioned above. Alternatively, the prepolymer may contain two or more different types of divalent aromatic groups.

Particularly preferred is a polycarbonate containing an unsubstituted or substituted bisphenol A group represented by the formula:

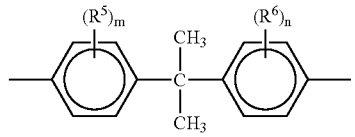

in an amount of 85 to 100 mole %, based on the total number of moles of all of Ar's. Most preferred among these is the polycarbonate wherein the bisphenol A group is unsubstituted, i.e., $R^5$ and $R^6$ are each H.

The aromatic polycarbonates can be manufactured by any processes such as by reacting a dihydric phenol with a carbonate precursor, such as phosgene, a haloformate or carbonate ester in melt or solution. Suitable processes are disclosed in U.S. Pat. Nos. 2,991,273; 2,999,846; 3,028,365; 3,153,008; 4,123,436. They can also be manufactured via ring-opening polymerization of macrocyclic polycarbonate oligomers.

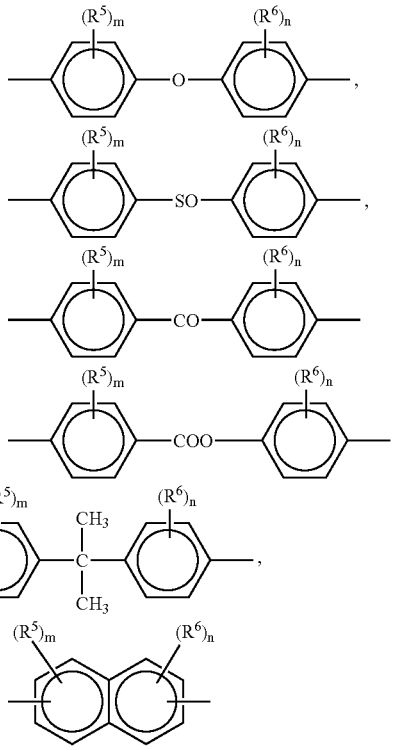

Preparation of polycarbonates is reviewed by Daniel J. Brunelle, in "Polycarbonates," *Encyclopedia of Polymer Science and Technology*, John Wiley & Sons, Inc (2002). Bisphenol A ("BPA") based polycarbonates are known for toughness and clarity and typically exhibit a glass transition temperature in the range of 140-155° C. Most BPA polycarbonates are produced today by an interfacial polymerization process in which phosgene and a tertiary amine catalyst are added to a slurry or solution of bisphenol A and 1-5% of a chain stopper such as phenol, p-t-butylphenol, or p-cumylphenol in a mixture of methylene chloride and water.

Polycarbonates can also be prepared via ring-opening polymerization of macrocyclic polycarbonate oligomers, preferably using a mixture of such oligomers to achieve a melt at a conveniently low temperature, say, 200-210° C. Ring opening polymerization can be carried out in solution or in the melt, as is known in the art; see, e.g., "Cyclic oligomers of polycarbonates and polyesters" in *Cyclic Polymers*, Second Edition, J. A. Semlyn (ed.), (2000), Kluwer Academic Publishers (Netherlands), 185-228.

There is growing interest in using transesterification processes carried out in the melt to make bisphenol A-based polycarbonates. Melt processes are solvent-free and thus environmentally more benign. Such processes involve the transesterification of bisphenol A with a carbonate source, such as diphenyl carbonate. The reaction is base-catalyzed, typically with less than 0.01 mol % of, e.g., alkali hydroxides or carbonates, tetraalkyammonium hydroxides or carbonates, or tetraalkylphosphonium hydroxides or carbonates. The transesterification reaction produces polycarbonate and phenol. The phenol is removed. The prolonged residence times and high temperature typically needed to produce polycarbonate with a useable molecular weight can result in degradation and discoloration. Use of highly purified starting materials and more effective catalysts ameliorates this problem. Alternatively, instead of using only melt esterification to make high molecular weight polycarbonate, one can prepare low molecular weight polycarbonate in the melt and then solid state polymerize to high molecular weight.

Process Conditions

Disclosed herein is a process for preparing a polycarbonate nanocomposite, comprising polymerizing the polycarbonate precursor, by melt polymerization or by interfacial polymerization, in the presence of a sepiolite-type clay and optionally solid state polymerizing the nanocomposite so produced.

This invention also concerns a process for the formation of a shaped part from a polycarbonate nanocomposite, comprising the steps:

(a) preparing a nanocomposite of polycarbonate and sepiolite-type clay, by polymerizing at least one polycarbonate precursor in the presence of a sepiolite-type clay and a catalyst to form a polycarbonate;

(b) heating the nanocomposite to a temperature above the glass transition temperature of the polycarbonate produced in step (a) at which the polycarbonate is formable;

(c) optionally, melt-mixing the nanocomposite with one or more additional ingredients;

(d) forming the product of step (b) or (c) into the desired shape; and (e) cooling the product of step (d) from a temperature above the glass transition temperature of said polycarbonate to a temperature below said glass transition temperature.

Process conditions for making the nanocomposite material are the same as those known in the art for manufacturing polycarbonates in a melt or solution process, as described above. The sepiolite-type clay mineral can be added by any means known in the art at any convenient stage of manufacture before the degree of polymerization is about 20. For example, it can be added at the beginning of the process with the starting materials (e.g., diphenyl carbonate and bisphenol A, macrocyclic polycarbonate oligomers, linear polycarbonate oligomers), or during subsequent reaction steps (transesterification, ring opening, polycondensation).

The polycarbonate nanocomposite is heated to a temperature above the glass transition temperature of the polycarbonate at which it is formable; optionally melt-mixed with additional ingredients as described below, formed into the desired shape (typically, droplets or a strand), and cooled from a temperature above a melting point of said polycarbonate to a temperature below said melting point. Particle formation can be carried out through a number of processes such as prilling, pastillization and strand cutting, as is known in the art. The particle formation and crystallization processes can be carried out as separate steps or as a single step. This single step process can be done, for example, by using a heated turntable or using a ROTOFORMER® pastillator with a heated belt, as disclosed in U.S. Pat. No. 5,633,018. In this technology, a melt is formed into particles (corresponding to step (c) above) which are held at an appropriate, cooler temperature for crystallization (corresponding to step (d) above), thus combining crystallization and particle formation into a single step. Crystallization occurs at a temperature below the melting temperature and above the $T_g$ of the mixture, generally close to the temperature of maximum crystallization rate.

The semicrystalline particles so formed can then be solid state polymerized to the desired high molecular weight. For example, the particles can be heated at 180° C. to 250° C. under a flow of inert gas or under vacuum to increase molecular weight. The solid state polymerized polycarbonate nanocomposite so formed can itself be used as a convenient nucleating agent for the crystallization of polycarbonate. In that case, the solid state polymerized nanocomposite itself, preferably ground to a fine powder, is added to a melt of polycarbonate oligomer. This melt is then formed into particles, crystallized at a temperature above its glass transition temperature, and then solid state polymerized to the desired molecular weight.

Uses

It is expected that articles formed comprising the polycarbonate nanocomposites of the present invention would find utility in many applications where polycarbonate is currently used and demonstrate improved impact strength and heat resistance. Examples include, but are not limited to, glazing and sheet; automotive components; appliances, such as houseware items and power tools; packaging, such as refillable water bottles and refillable milk bottles; electrical, electronic, and technical components; medical and health-care related articles; and leisure and safety articles. Examples of glazing and sheet applications include, but are not limited to, windows for airplanes, trains, and schools; and high speed aircraft canopies. Such products may be laminated, for example, with a soft inner layer. Examples of automotive components include, but are not limited to, headlamp assemblies, interior instrument panels, bumpers, and automotive window glazing. Examples of electrical, electronic, and technical components include, but are not limited to, electrical connectors, telephone network devices, outlet boxes, computer and business machine housings, instrument panels, membrane switches and insulators. Examples of leisure and safety articles include, but are not limited to, protective headgear (e.g., sports helmets, motorcycle helmets, and safety helmets for firefighters and constructions workers) and protective eyewear (e.g., for goggles, safety glasses, safety sideshields, eyeglasses, and masks).

The polycarbonate nanocomposites of the present invention can be blended with other polymers that are currently blended with polycarbonate (see, e.g., Daniel J. Brunelle, in "Polycarbonates," *Encyclopedia of Polymer Science and Technology*, John Wiley & Sons, Inc (2002)). Such blends may be made by conventional melt processing techniques.

For examples, pellets of the polycarbonate may be mixed with pellets of the polymer(s) with which it is to be blended and subsequently melt compounded on either a single or twin screw extruder to form a homogenous mixture.

Polycarbonate is blended with polyesters, such as poly (ethylene terephthalate) and poly(butylene terephthalate), to improve its flow characteristics and solvent resistance, particularly for automotive applications. The polycarbonate nanocomposites of the present invention can be used in place of some or all of the polycarbonate in such blends.

Polycarbonate is also blended with ABS (acrylonitrile-butadiene-styrene copolymer), which lowers melt viscosity and improves low-temperature low impact strength. Polycarbonate/ABS blends are used, for example, in automotive applications, such as instrument panels, and in computer and printer housings. The polycarbonate nanocomposites of the present invention can be used in place of some or all of the polycarbonate in such blends.

Such blend compositions may contain impact modifiers, UV stabilizers, stabilizers, nucleating agents, extenders, flame retarding agents, reinforcing agents, fillers, antistatic agents, mold release agents, colorants, antioxidants, extrusion aids, slip agents, release agents, carbon black, and other pigments, and the like all and mixtures thereof which are known in the art.

EXAMPLES

The present invention is further defined in the following Examples. It should be understood that these Example, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "$T_m$" means melting point, "$T_g$" means glass transition temperature, "min" means minute(s), "h" means hour(s), "mtorr" means millitorr, "J" means Joule(s), "g" means gram(s), "ppm" means parts per million, "mol" means mole, and "$M_{peak}$" means the peak molecular weight.

Materials

Bisphenol A (CAS # 80-05-7, 97%), diphenyl carbonate (CAS #109-09-0, 99%), and titanium tetrabutoxide (CAS # 5593-70-4, 97%) were purchased from Aldrich Chemical Company (Milwaukee, Wis.). PANGEL® B20 sepiolite was purchased from EM Sullivan Associates, Inc. (Paoli, Pa.).

Analytical Methods

A size exclusion chromatography system comprised of a Model Alliance 2690™ from Waters Corporation (Milford, Mass.), with a Waters 410™ refractive index detector (DRI) and Viscotek Corporation (Houston, Tex.) Model T-60A™ dual detector module incorporating static right angle light scattering and differential capillary viscometer detectors was used for molecular weight characterization. The mobile phase was 1,1,1,3,3,3-hexafluoro-2-propanol (HFIP) with 0.01 M sodium trifluoroacetate. The dn/dc was measured for the polymers, and it was assumed that all of the sample was completely eluted during the measurement.

Melting point ($T_m$) and glass transition temperature ($T_g$). Unless otherwise noted, melting points were measured with differential scanning calorimetry by ASTM Method D3418, using a heating rate of 10° C./min. Melting points were taken as the maximum of the melting endotherm and are measured on the first heat. If more than one melting point was present, the melting point of the polymer was taken as the highest of the melting points. A melting point had a heat of fusion of at least 3 J/g associated with that melting point. Glass transition temperatures were reported as the inflection point of the change in heat capacity. $T_c$ was taken as the maximum of crystallization exotherm and was determined on the second heat.

Example 1

To a 1 liter reaction vessel were added bisphenol A (136.98 g), diphenyl carbonate (138.7 g), PANGEL® B20 sepiolite (8.27 g), and titanium tetrabutoxide (0.035 g, 123 ppm). The reactor was sealed and flushed with nitrogen for 30 min. The reaction was heated to 180° C. and placed under a light vacuum (1000 mtorr) for 30 min. The reaction was heated to 210 and held at 500 mtorr for 30 min. The reaction temperature was slowly increased to 270° C. at a heating rate of 1° C./min. The reaction was held at 270° C. under a vacuum of 500 mtorr for 30 min. The vacuum was slowly increased to a full vacuum (50 mtorr) and held isobarically for 2 h. The temperature was increased to 290° C. and the reaction was held isothermally for 1.5 h. The reaction was cooled under a nitrogen head. The sample was found to have $M_{peak}$=8900 g/mol, $T_g$=113° C., $T_c$=195° C., and $T_m$=221° C. A transmission electron micrograph showing exfoliated sepiolite in the sample is presented as FIG. 1. The sample was visually transparent and slightly yellow.

Example 2

Polycarbonate nanocomposite particles are prepared as in Example 1 and are then solid state polymerized in a 2 inch diameter glass solid state polymerization device. The sample is heated in a flowing stream of nitrogen gas at 190° C. for 1 h, followed by 24 h at 200° C. A DSC of this sample shows an elevated melting temperature of over 250° C. and a heat of fusion at least 40 J/g. A portion of this sample is then ground while immersed in liquid nitrogen. The finest particles are segregated by sieving through a 400 mesh screen.

Amorphous polycarbonate oligomer (intrinsic viscosity=0.15) is formed by melt polymerization of diphenyl carbonate and bisphenol A. A DSC trace of this sample shows a glass transition at 109° C., no crystallization exotherm present on heating, no melting transition, and no crystallization peak upon cooling from the melt. The segregated fine particles of polycarbonate nanocomposite are mixed at a level of 0.5 wt % with the amorphous polycarbonate oligomer. This mixture is heated in an air oven at 245° C. and then slowly poured into a room temperature aluminum pan to form particles of about 25 mg mass. A DSC trace is recorded for this material. On first heating, the glass transition temperature is about 45° C., a crystallization exotherm (over 20 J/g) occurs at about 125° C., and a melting transition (about 20 J/g) occurs with $T_m$ about 210° C. Upon cooling at 10° C./min, the sample crystallizes at about 160° C. with a heat of crystallization of about 20 J/g. The second heating shows a glass transition at about 60° C. and $T_m$ about 210° C. with an enthalpy of 22 J/g.

Example 3

A slurry of bisphenol A, 1 weight percent sepiolite-type clay, and 3 weight percent phenol is stirred in a mixture of methylene chloride and water. Gaseous phosgene is added in the presence of 0.1 weight percent of a tertiary amine catalyst, while sodium hydroxide solution is added to maintain the pH at about 10-12. When free phenolic groups can no longer be detected, phosgene addition is stopped, and the nanocomposite of polycarbonate with exfoliated sepiolite-type clay is isolated.

What is claimed is:

1. A polycarbonate nanocomposite composition, comprising:
   at least one crystallized polycarbonate; and
   exfoliated sepiolite clay or exfoliated attapulgite clay, prepared by a process comprising the steps:
   (a) preparing a nanocomposite of polycarbonate and sepiolite clay or attapulgite clay, by polymerizing at least one polycarbonate precursor in the presence of sepiolite clay or attapulgite clay and a catalyst to form a polycarbonate;
   (b) heating the nanocomposite to a temperature above the glass transition temperature of the polycarbonate produced in step (a) at which the polycarbonate is formable;
   (c) optionally, melt-mixing the nanocomposite with one or more additional ingredients;
   (d) forming the product of step (b) or (c) into particles;
   (e) cooling the particles to a temperature below a melting point of said polycarbonate and above the glass transition temperature of said polycarbonate; and
   (f) allowing the particles to crystallize at the temperature to which they were cooled in step (e).

2. The polycarbonate nanocomposite composition of claim 1 wherein the exfoliated sepiolite clay or exfoliated attapulgite clay is present at about 0.1 to about 20 weight percent based on the weight of polycarbonate and exfoliated sepiolite clay or exfoliated attapulgite clay.

3. The polycarbonate nanocomposite composition of claim 1 wherein the polycarbonate is represented by the formula

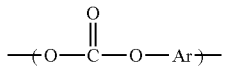

wherein Ar is a divalent aromatic group.

4. The polycarbonate nanocomposite composition of claim 3 where Ar is represented by the formula

wherein each of $Ar^1$ and $Ar^2$ independently represents a divalent carbocyclic or heterocyclic aromatic group having from 5 to 30 carbon atoms, and Y represents a divalent alkane group having from 1 to 30 carbon atoms.

5. The polycarbonate nanocomposite composition of claim 4 wherein Y is isopropylidene

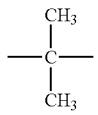

and $Ar^1$ and $Ar^2$ are each para-phenylene.

6. A process for preparing a polycarbonate nanocomposite, comprising polymerizing at least one polycarbonate precursor, by melt polymerization or by interfacial polymerization, in the presence of sepiolite clay or attapulgite clay and a catalyst and optionally solid state polymerizing the nanocomposite so produced.

7. A process for preparing semicrystalline polycarbonate nanocomposite particles, comprising the steps:
   (a) preparing a nanocomposite of polycarbonate and sepiolite clay or attapulgite clay, by polymerizing at least one polycarbonate precursor in the presence of a sepiolite clay or attapulgite clay and a catalyst to form a polycarbonate;
   (b) heating the nanocomposite to a temperature above the glass transition temperature of the polycarbonate produced in step (a) at which the polycarbonate is formable;
   (c) optionally, melt-mixing the nanocomposite with one or more additional ingredients;
   (d) forming the product of step (b) or (c) into particles;
   (e) cooling the particles to a temperature below a melting point of said polycarbonate and above the glass transition temperature of said polycarbonate; and
   (f) allowing the particles to crystallize at the temperature to which they were cooled in step (e).

8. The process as recited in claim 7 wherein the at least one polycarbonate precursor is a mixture of bisphenol A and diphenyl carbonate.

9. The process as recited in claim 7 wherein the at least one polycarbonate precursor comprises macrocyclic polycarbonate oligomers.

10. A process for preparing crystallized polycarbonate comprising the steps:
    (a) preparing semicrystalline polycarbonate nanocomposite particles according to the process recited in claim 7;
    (b) solid state polymerizing the semicrystalline polycarbonate nanocomposite particles produced in step (a) to a higher molecular weight;
    (c) grinding the solid state polymerized nanocomposite particles to a fine powder;
    (d) adding the fine powder to a melt of amorphous polycarbonate oligomer;
    (e) forming the product of step (d) into particles;
    (f) crystallizing the particles formed in step (e) at a temperature above their glass transition temperature; and
    (g) solid state polymerizing the crystallized particles to the desired higher molecular weight.

11. An article of manufacture comprising the polycarbonate nanocomposite composition of claim 1.

12. The article of manufacture of claim 11 wherein said article is glazing or sheet, a component of a window for an airplane, a train, a school, or a high speed aircraft canopy; an automotive component, headlamp assembly, interior instrument panel, bumper, or automotive window glazing; an appliance, houseware item or power tool; packaging, a refillable water bottle or a refillable milk bottle; an electrical, electronic, or technical component, an electrical connector, telephone network device, outlet box, computer or business machine housing, instrument panel, membrane switch, or insulator; a medical or health care related article; a leisure or safety article, protective headgear, protective eyewear, goggles, safety glasses, safety sideshields, eyeglasses, mask, sports helmet, motorcycle helmet, or safety helmet for firefighters or construction workers.

13. A polymer blend comprising the polycarbonate nanocomposite of claim 1 and a polyester.

14. The polymer blend of claim 13 wherein said polyester is poly(ethylene terephthalate) or poly(butylene terephthalate).

15. A polymer blend comprising the polycarbonate nanocomposite of claim 1 and an acrylonitrile-butadiene-styrene copolymer.

16. An article of manufacture comprising the polymer blend of claim 13.

17. An article of manufacture comprising the polymer blend of claim 15.

18. The process as recited in claim 7 further comprising solid state polymerizing the product of step (f) to a higher molecular weight.

19. The process as recited in claim 7 wherein the at least one polycarbonate precursor comprises linear polycarbonate oligomers.

* * * * *